(12) United States Patent
Gill

(10) Patent No.: US 7,023,671 B2
(45) Date of Patent: Apr. 4, 2006

(54) HARD BIAS STRUCTURE WITH ANTIPARALLEL LAYERS

(75) Inventor: Hardayal Singh Gill, Palo Alto, CA (US)

(73) Assignee: Hitachi Global Storage Technologies, Netherlands, B.V., Amsterdam (NL)

( * ) Notice: Subject to any disclaimer, the term of this patent is extended or adjusted under 35 U.S.C. 154(b) by 243 days.

(21) Appl. No.: 10/622,894

(22) Filed: Jul. 18, 2003

(65) Prior Publication Data

US 2005/0013062 A1    Jan. 20, 2005

(51) Int. Cl.
G11B 5/39    (2006.01)
(52) U.S. Cl. .................................. 360/324.12
(58) Field of Classification Search ..............................
360/324.11–324.12
See application file for complete search history.

(56) References Cited

U.S. PATENT DOCUMENTS 6,266,218 B1 *  7/2001  Carey et al. ............ 360/324.12
2002/0024781 A1 * 2/2002  Ooshima et al. ....... 360/324.12

* cited by examiner

Primary Examiner—A. J. Heinz
(74) Attorney, Agent, or Firm—Zilka-Kotab, PC

(57) ABSTRACT

A magnetic head having a sensor with a free layer, the free layer having a magnetic moment. Hard bias structures are positioned towards opposite ends of the sensor, the hard bias structures stabilizing the magnetic moment of the free layer. Each hard bias structure includes an antiparallel (AP) pinned layer structure and an antiferromagnetic layer positioned towards each of the AP pinned layer structures. Each AP pinned layer structure has a middle pinned layer aligned along a plane of the free layer of the sensor, and outer pinned layers positioned on opposite sides of the middle pinned layer. Each antiferromagnetic layer stabilizes a magnetic moment of the pinned layer closest thereto.

19 Claims, 9 Drawing Sheets

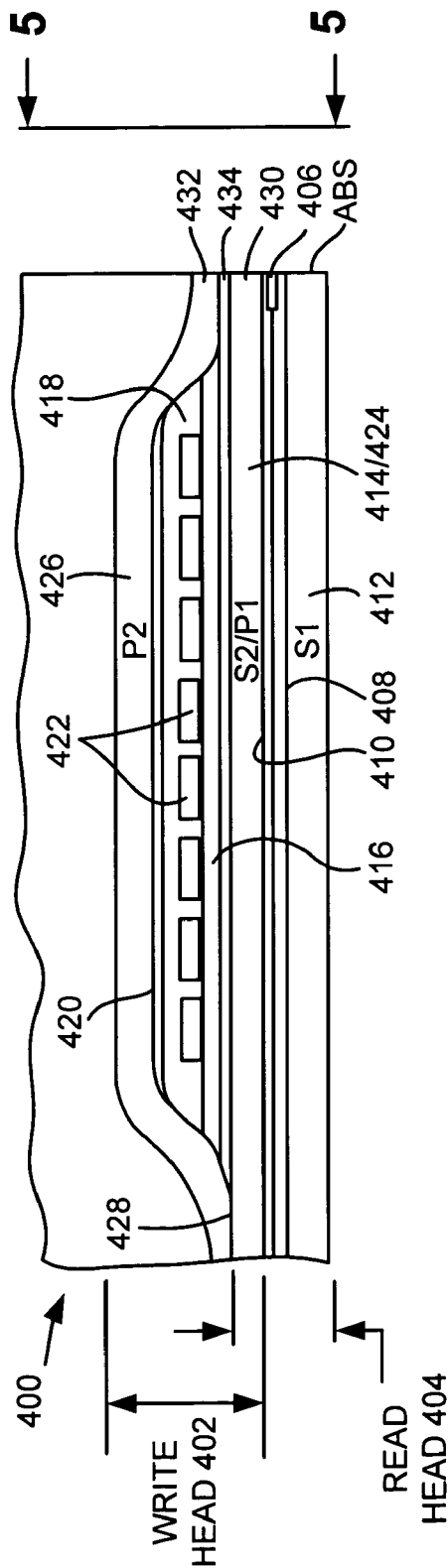
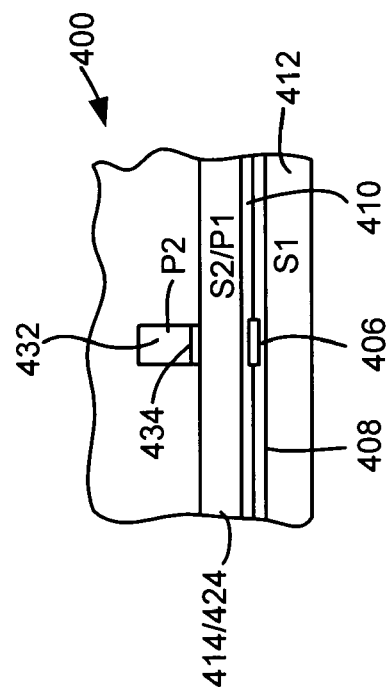
FIG. 4
FIG. 5

HARD BIAS STRUCTURE WITH ANTIPARALLEL LAYERS

FIELD OF THE INVENTION

The present invention relates to magnetic heads, and more particularly, this invention relates to read heads having hard bias layers with enhanced pinning of free layers in the hard bias layers.

BACKGROUND OF THE INVENTION

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

In high capacity disk drives, magnetoresistive (MR) read sensors, commonly referred to as MR heads, are the prevailing read sensors because of their capability to read data from a surface of a disk at greater track and linear densities than thin film inductive heads. An MR sensor detects a magnetic field through the change in the resistance of its MR sensing layer (also referred to as an "MR element") as a function of the strength and direction of the magnetic flux being sensed by the MR layer.

The conventional MR sensor operates on the basis of the anisotropic magnetoresistive (AMR) effect in which an MR element resistance varies as the square of the cosine of the angle between the magnetization in the MR element and the direction of sense current flow through the MR element. Recorded data can be read from a magnetic medium because the external magnetic field from the recorded magnetic medium (the signal field) causes a change in the direction of magnetization of the MR element, which in turn causes a change in resistance of the MR element and a corresponding change in the sensed current or voltage.

Another type of MR sensor is the giant magnetoresistance (GMR) sensor manifesting the GMR effect. In GMR sensors, the resistance of the GMR sensor varies as a function of the spin-dependent transmission of the conduction electrons between ferromagnetic layers separated by a non-magnetic layer (spacer) and the accompanying spin-dependent scattering which takes place at the interface of the ferromagnetic and non-magnetic layers and within the ferromagnetic layers.

GMR sensors using only two layers of ferromagnetic material (e.g., Ni—Fe) separated by a layer of non-magnetic material (e.g., copper) are generally referred to as spin valve (SV) sensors. In an SV sensor, one of the ferromagnetic layers, referred to as the pinned layer (reference layer), has its magnetization typically pinned by exchange coupling with an antiferromagnetic (e.g., NiO or Fe—Mn) layer. The pinning field generated by the antiferromagnetic layer should be greater than demagnetizing fields (about 200 Oe) at the operating temperature of the SV sensor (about 120° C.) to ensure that the magnetization direction of the pinned layer remains fixed during the application of external fields (e.g., fields from bits recorded on the disk). The magnetization of the other ferromagnetic layer, referred to as the free layer, however, is not fixed and is free to rotate in response to the field from the recorded magnetic medium (the signal field). U.S. Pat. No. 5,206,590 granted to Dieny et al., incorporated herein by reference, discloses a SV sensor operating on the basis of the GMR effect.

An exemplary high performance read head employs a spin valve sensor for sensing the magnetic signal fields from the rotating magnetic disk. FIG. 1A shows a prior art SV sensor 100 comprising a free layer (free ferromagnetic layer) 110 separated from a pinned layer (pinned ferromagnetic layer) 120 by a non-magnetic, electrically-conducting spacer layer 115. The magnetization of the pinned layer 120 is fixed by an antiferromagnetic (AFM) layer 130.

FIG. 1B shows another prior art SV sensor 150 with a flux keepered configuration. The SV sensor 150 is substantially identical to the SV sensor 100 shown in FIG. 1A except for the addition of a keeper layer 152 formed of ferromagnetic material separated from the free layer 110 by a non-magnetic spacer layer 154. The keeper layer 152 provides a flux closure path for the magnetic field from the pinned layer 120 resulting in reduced magnetostatic interaction of the pinned layer 120 with the free layer 110. U.S. Pat. No. 5,508,867 granted to Cain et al., incorporated herein by reference, discloses a SV sensor having a flux keepered configuration.

Another type of SV sensor is an antiparallel (AP)-pinned SV sensor. In AP-Pinned SV sensors, the pinned layer is a laminated structure of two ferromagnetic layers separated by a non-magnetic coupling layer such that the magnetizations of the two ferromagnetic layers are strongly coupled together antiferromagnetically in an antiparallel orientation. The AP-Pinned SV sensor provides improved exchange coupling of the antiferromagnetic (AFM) layer to the laminated pinned layer structure than is achieved with the pinned layer structure of the SV sensor of FIG. 1A. This improved exchange coupling increases the stability of the AP-Pinned SV sensor at high temperatures which allows the use of corrosion resistant antiferromagnetic materials such as NiO for the AFM layer.

Referring to FIG. 2A, an AP-Pinned SV sensor 200 comprises a free layer 210 separated from a laminated AP-pinned layer structure 220 by a nonmagnetic, electrically-conducting spacer layer 215. The magnetization of the laminated AP-pinned layer structure 220 is fixed by an AFM layer 230. The laminated AP-pinned layer structure 220 comprises a first ferromagnetic layer 226 and a second ferromagnetic layer 222 separated by an antiparallel coupling layer (APC) 224 of nonmagnetic material. The two ferromagnetic layers 226, 222 ($FM_1$ and $FM_2$) in the laminated AP-pinned layer structure 220 have their magnetization directions oriented antiparallel, as indicated by the arrows 227, 223 (arrows pointing out of and into the plane of the paper respectively).

A key requirement for optimal operation of an SV sensor is that the pinned layer should be magnetically saturated perpendicular to the air bearing surface. Lack of magnetic saturation in the pinned layer leads to reduced signal or dynamic range. Factors leading to a loss of saturation include demagnetizing fields at the edge of the pinned layer, magnetic fields from recorded data and from longitudinal biasing regions, current induced fields and the coupling field to the free layer.

Analysis of the magnetic state of pinned layers in small sensors (a few microns or less in width), reveals that due primarily to the presence of large demagnetizing fields at the sensor edges the magnetization is not uniform over the area of the pinned layer. FIG. 2B shows a perspective view of an SV sensor 250. The SV sensor 250 is formed of a sensor stripe 260 having a front edge 270 at the ABS and extending away from the ABS to a rear edge 272. Due to the large demagnetizing fields at the front edge 270 and the rear edge 272 of the sensor stripe 260, the desired perpendicular magnetization direction is achieved only at the center portion 280 of the pinned layer stripe, while the magnetization tends to be curled into a direction parallel to the ABS at the edges of the stripe. The extent of these curled regions is controlled by the magnetic stiffness of the pinned layer.

Furthermore, prior art AP-Pinned SV sensors use an AFM in order to pin the pinned layer magnetization. Most commonly used AFM materials have blocking temperatures (temperature at which the pinning field reaches zero Oe) near 200° C. This means that if the temperature of the SV sensor approaches this temperature, the pinned layer magnetization can change its orientation resulting in degraded SV sensor performance.

Although AP-Pinned SV sensors have large effective pinning fields because near cancellation of the magnetic moments of the two sub-layers results in a low net magnetic moment for the pinned layer, thermal stability is still a concern because the operating temperatures of these SV sensors in disk files can exceed 120° C. In addition, the AP-pinned layer structure is vulnerable to demagnetization during processing operations such as lapping.

Therefore there is a need for an SV sensor that increases the magnetic saturation of the pinned layer and reduces the sensitivity to demagnetizing fields particularly at the front and rear edges of the pinned layer stripe. In SV sensors that include AFM layers to provide exchange anisotropy fields to fix the pinned layer magnetization direction, there is a further need for an SV structure that reduces the temperature limitations imposed by the blocking temperature characteristics of the commonly used antiferromagnetic materials required in prior art SV sensors for providing pinning fields.

In any of the prior art sensors described above, the thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

The transfer curve of a spin valve sensor is defined by the aforementioned cos θ where θ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields from the magnetic disk.

Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. When the readback signals are asymmetrical, signal output and dynamic range of the sensor are reduced. Readback asymmetry is defined as:

$$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in some applications. +10% readback asymmetry may not be acceptable in applications where the applied field magnetizes the free layer close to saturation. The designer strives to improve asymmetry of the readback signals as much as practical with the goal being symmetry.

The location of the transfer curve relative to the bias point is influenced by four major forces on the free layer of a spin valve sensor, namely a ferromagnetic coupling field $H_{FC}$ between the pinned layer and the free layer, a net demagnetizing (demag) field $H_D$ from the pinned layer, a sense current field $H_I$ from all conductive layers of the spin valve except the free layer, a net image current field $H_{IM}$ from the first and second shield layers.

What is needed is an antiparallel hard bias structure which provides stronger pinning compared to conventional hard bias structures using hard bias layers.

SUMMARY OF THE INVENTION

A magnetic head according to a preferred embodiment includes a sensor with a free layer, the free layer having a magnetic moment. Hard bias structures are positioned towards opposite ends of the sensor, the hard bias structures stabilizing the magnetic moment of the free layer. Each hard bias structure includes an antiparallel (AP) pinned layer structure and an antiferromagnetic layer positioned towards each of the AP pinned layer structures. Each AP pinned layer structure has a middle pinned layer aligned along a plane of the free layer of the sensor, and outer pinned layers positioned on opposite sides of the middle pinned layer. Each antiferromagnetic layer stabilizes a magnetic moment of the pinned layer closest thereto.

Preferably, a net magnetic moment of the AP pinned layer structure is about zero. Also preferably, a thickness of the middle pinned layer is at least as thick as the free layer of the sensor, and may be twice as thick as the free layer of the sensor or more.

In a preferred embodiment, the outer pinned layers are misaligned from the free layer. The pinned layers of the AP pinned layer structure may each include at least Co and are separated by a layer of Ru. The antiferromagnetic layers may each include PtMn and/or IrMn.

The heads described herein may form part of a GMR head, a CIP GMR head, a CPP GMR head, a tunnel valve head, etc. for use in a magnetic storage system.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 4 is a partial view of the slider and a merged magnetic head.

FIG. 5 is a partial ABS view, not to scale, of the slider taken along plane 5—5 of FIG. 4 to show the read and write elements of the merged magnetic head.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1A:
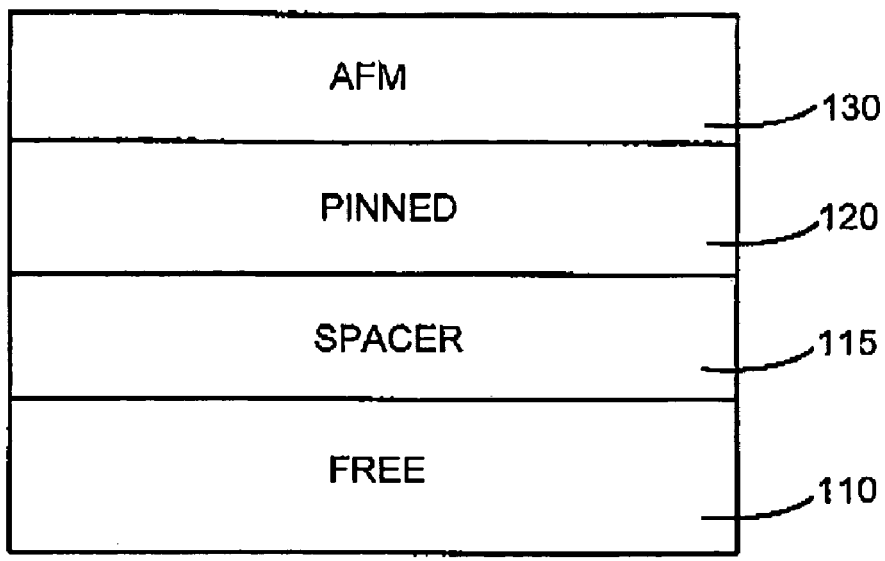
FIG. 1A is an air bearing surface view, not to scale, of a prior art spin valve (SV) sensor.
Figure 1B:
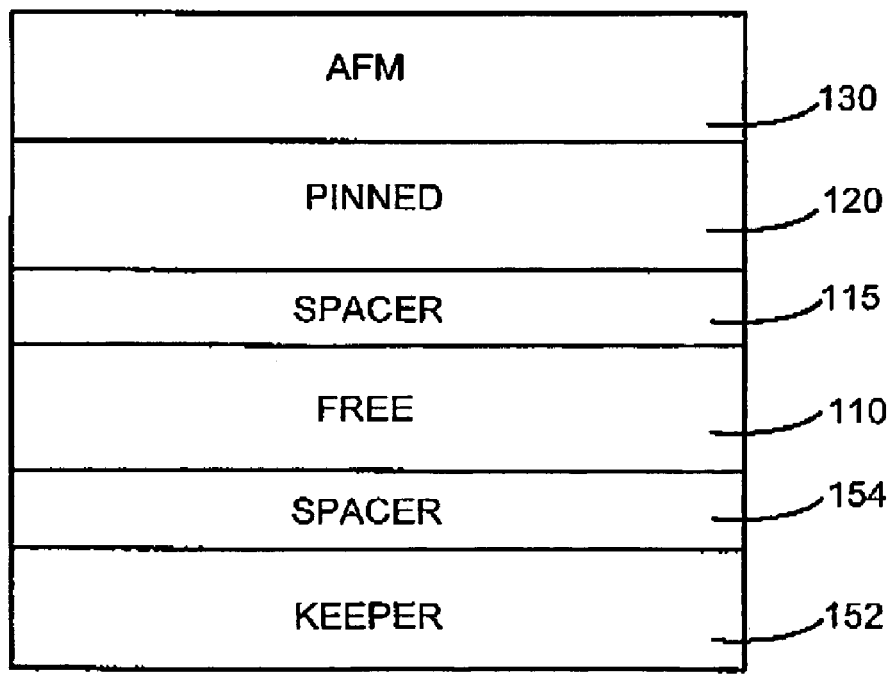
FIG. 1B is an air bearing surface view, not to scale, of a prior art keepered SV sensor.
Figure 2A:
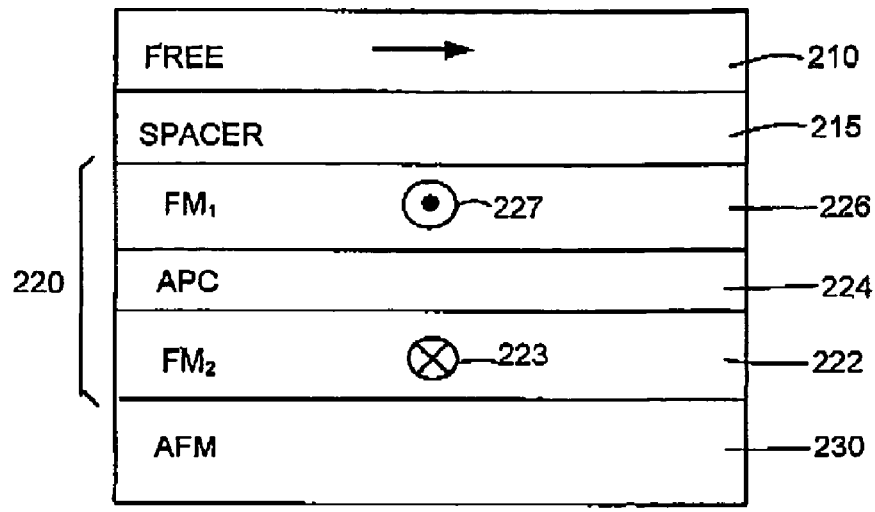
FIG. 2A is an air bearing surface view, not to scale, of a prior art AP-Pinned SV sensor.
Figure 2B:
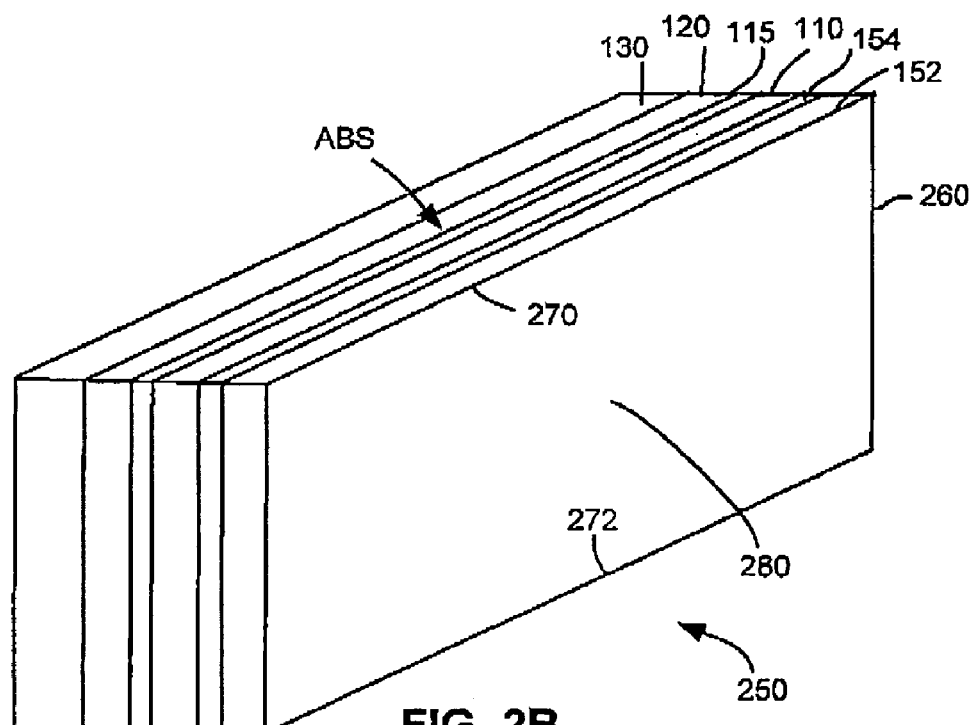
FIG. 2B is a perspective view, not to scale, of a prior art AP-Pinned SV sensor.
Figure 3:
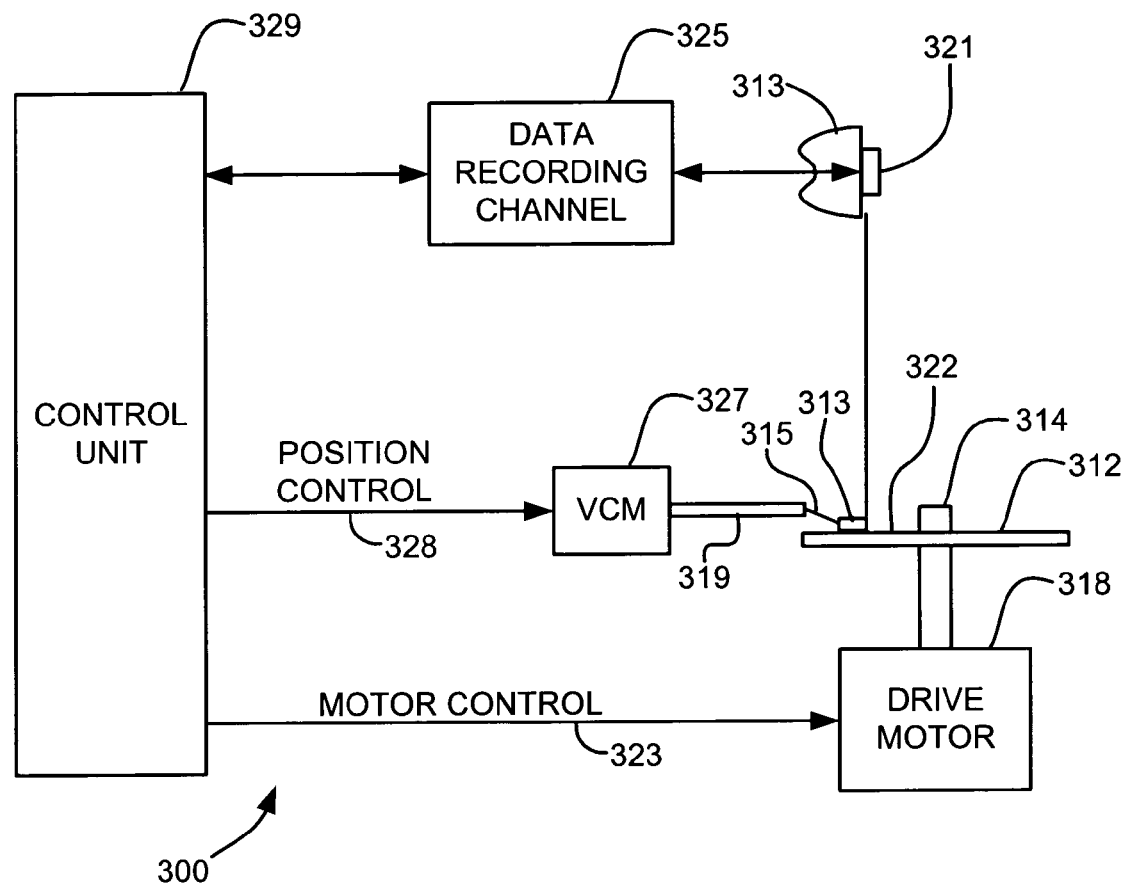
FIG. 3 is a simplified drawing of a magnetic recording disk drive system.

Referring now to FIG. 3, there is shown a disk drive 300 embodying the present invention. As shown in FIG. 3, at least one rotatable magnetic disk 312 is supported on a spindle 314 and rotated by a disk drive motor 318. The magnetic recording on each disk is in the form of an annular pattern of concentric data tracks (not shown) on the disk 312.

At least one slider 313 is positioned near the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different tracks of the disk where desired data are recorded. Each slider 313 is attached to an actuator arm 319 by means way of a suspension 315. The suspension 315 provides a slight spring force which biases slider 313 against the disk surface 322. Each actuator arm 319 is attached to an actuator means 327. The actuator means 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage means and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325.

The above description of a typical magnetic disk storage system, and the accompanying illustration of FIG. 3 are for representation purposes only. It should be apparent that disk storage systems may contain a large number of disks and actuators, and each actuator may support a number of sliders.

FIG. 4 is a side cross-sectional elevation view of a merged magnetic head 400, which includes a write head portion 402 and a read head portion 404, the read head portion employing a dual spin valve sensor 406 of the present invention. FIG. 5 is an ABS view of FIG. 4. The spin valve sensor 406 is sandwiched between nonmagnetic electrically insulative first and second read gap layers 408 and 410, and the read gap layers are sandwiched between ferromagnetic first and second shield layers 412 and 414. In response to external magnetic fields, the resistance of the spin valve sensor 406 changes. A sense current (Is) conducted through the sensor causes these resistance changes to be manifested as potential changes. These potential changes are then processed as readback signals by the processing circuitry 329 shown in FIG. 3.

The write head portion 402 of the magnetic head 400 includes a coil layer 422 sandwiched between first and second insulation layers 416 and 418. A third insulation layer 420 may be employed for planarizing the head to eliminate ripples in the second insulation layer caused by the coil layer 422. The first, second and third insulation layers are referred to in the art as an "insulation stack". The coil layer 422 and the first, second and third insulation layers 416, 418 and 420 are sandwiched between first and second pole piece layers 424 and 426. The first and second pole piece layers 424 and 426 are magnetically coupled at a back gap 428 and have first and second pole tips 430 and 432 which are separated by a write gap layer 434 at the ABS. Since the second shield layer 414 and the first pole piece layer 424 are a common layer this head is known as a merged head. In a piggyback head an insulation layer is located between a second shield layer and a first pole piece layer. First and second solder connections (not shown) connect leads (not shown) from the spin valve sensor 406 to leads (not shown) on the slider 313 (FIG. 3), and third and fourth solder connections (not shown) connect leads (not shown) from the coil 422 to leads (not shown) on the suspension.

Figure 6:
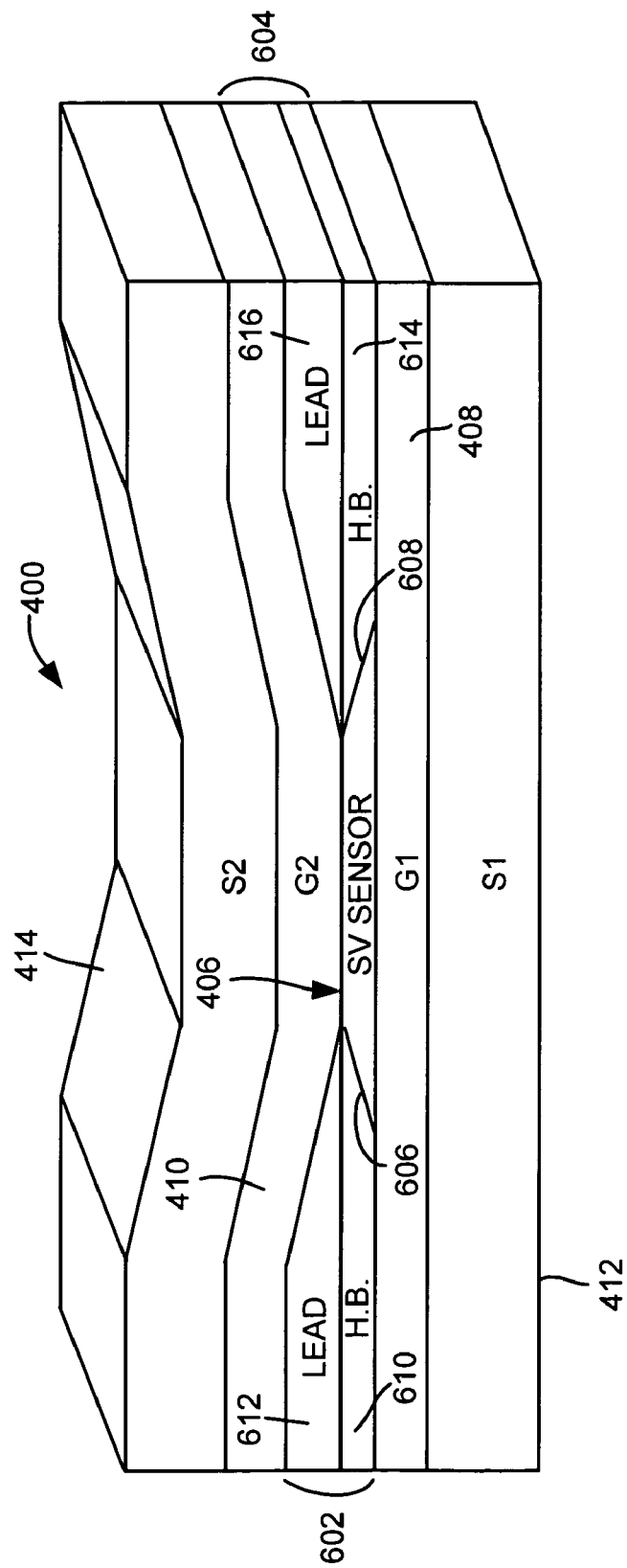
FIG. 6 is an enlarged isometric illustration, not to scale, of the read head with a spin valve sensor.

FIG. 6 is an enlarged isometric ABS illustration of the read head 400 shown in FIG. 4. The read head 400 includes the spin valve sensor 406. First and second hard bias and lead layers 602 and 604 are connected to first and second side edges 606 and 608 of the spin valve sensor. This connection is known in the art as a contiguous junction and is fully described in U.S. Pat. No. 5,018,037 which is incorporated by reference herein. The first hard bias and lead layers 602 include a first hard bias layer 610 and a first lead layer 612 and the second hard bias and lead layers 604 include a second hard bias layer 614 and a second lead layer 616. The hard bias layers 610 and 614 cause magnetic fields to extend longitudinally through the spin valve sensor 406 for stabilizing the magnetic domains therein. The spin valve sensor 406 and the first and second hard bias and lead layers 602 and 604 are located between the nonmagnetic electrically insulative first and second read gap layers 408 and 410. The first and second read gap layers 408 and 410 are, in turn, located between the ferromagnetic first and second shield layers 412 and 414.

In the following description, the width of the layers (W) refers to the track width. The sensor height is in a direction into the face of the paper. Unless otherwise described, thicknesses of the individual layers are taken perpendicular to the plane of the associated layer and are provided by way of example only and may be larger and/or smaller than those listed. Similarly, the materials listed herein are provided by way of example only, and one skilled in the art will understand that other materials may be used without straying from the spirit and scope of the present invention.

Figure 7:
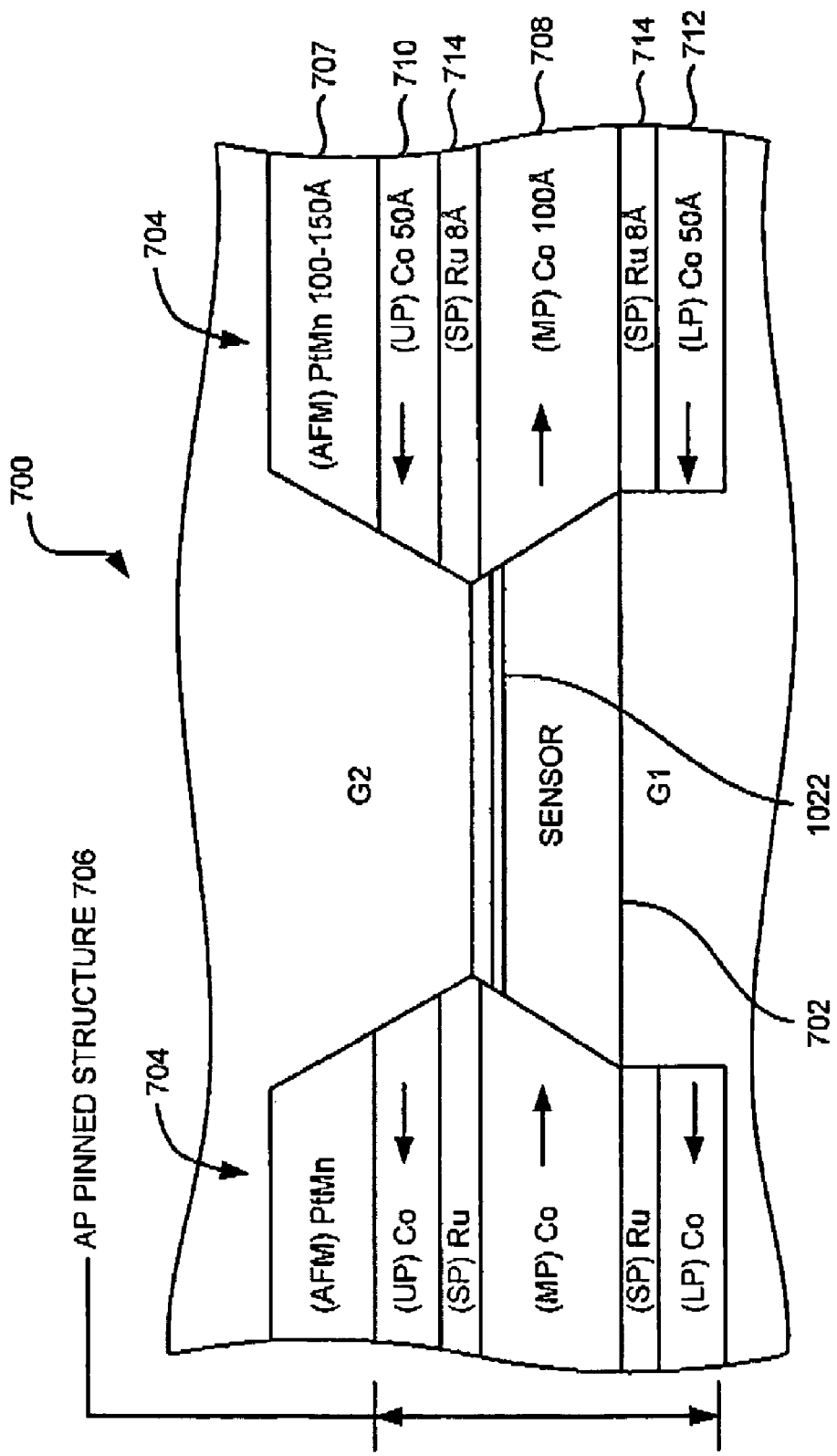
FIG. 7 is an ABS illustration of a sensor structure, not to scale, according to one embodiment of the present invention.

FIG. 7 depicts an ABS view of a sensor structure 700 according to one embodiment. As shown, a sensor 702 is positioned between two bias structures 704. Each bias structure 704 includes a trilayer AP pinned structure 706, which provides the longitudinal bias to the free layer, and an AFM layer (AFM) 707 positioned above or below the AP pinned structure 706 to provide further pinning of the AP pinned structure 706. This new scheme provides very strong AP coupling and is also relatively independent of the substrate and seed layer crystal structure.

Figure 10:
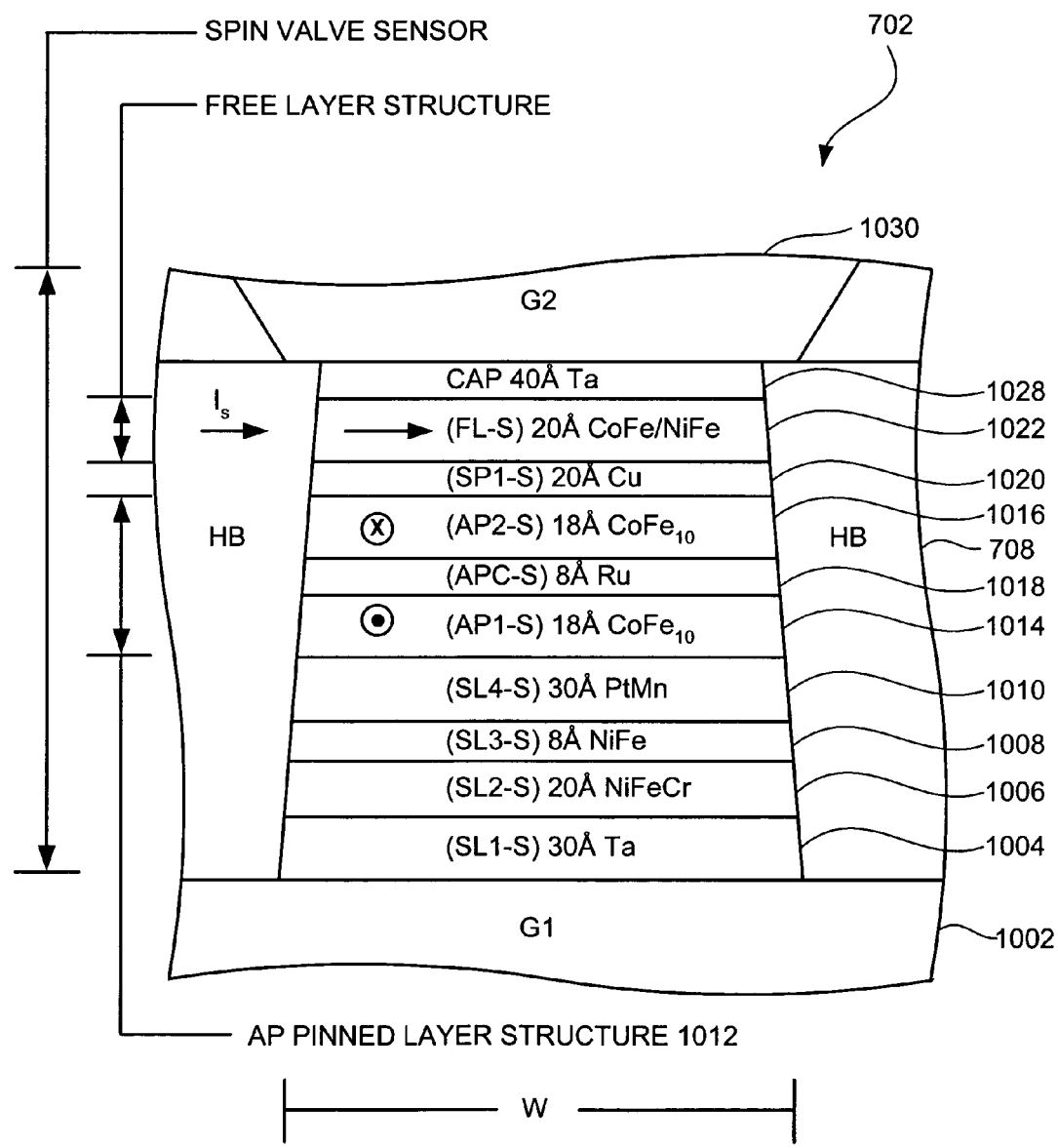
FIG. 10 is an ABS illustration of a sensor, not to scale, according to an embodiment of the present invention.

Referring to the structure itself, the sensor 702 can be a standard sensor 702 of any type. An illustrative sensor 702 is shown in FIG. 10.

Each AP pinned structure 706 includes a middle pinned layer (MP) 708. Upper and lower layers (UP, LP) 710, 712 (collectively, "outer pinned layers") are positioned above and below the middle pinned layer 708. Illustrative materials from which the pinned layers 708–712 can be formed include Co, CoFe, etc. The spacer layers (SP) 714 separating the pinned layers 708–712 are preferably Ru, which creates the AP coupling between the pinned layers 708–712. Note that the lower pinned layer 712 is below the sensor 702, so milling into the substrate may need to be performed.

Ideally, the net magnetization of the AP pinned structure 706 is about zero, i.e., the sum of the magnetic thicknesses of the outer pinned layers 710, 712 is about equal to the magnetic thickness of the middle pinned layer 708. Thus, preferably, the outer pinned layers 710, 712 each have about one half the magnetic thickness of the middle pinned layer 708. This provides a net magnetic moment of the AP pinned structure 706 of about zero, providing the strongest pinning. If the same material is used for all three layers 708–712, for example each outer layer 710, 712 will have one half the physical thickness of the middle pinned layer 708. For example, if the pinned layers 708–712 are CoFe, thicknesses of the outer pinned layers 710, 712 can be about 50 Å and the thickness of the middle pinned layer 708 can be about 100 Å.

The AFM layer 707 provides exchange anisotropy fields to fix the magnetization direction of the pinned layer closest to it. Preferred materials for the AFM layer 707 are PtMn and IrMn. The thickness of the AFM layer 707 can be about 100–150 Å if it is constructed from PtMn, and about 50–80 Å if it is constructed from IrMn, regardless of the thicknesses of the pinned layers 708–712. The thickness of the AFM layer 707 is not important because the net moment of the AP structure 706 is about zero. The zero net moment of the AP structure 706 coupled with the additional pinning by the AFM layer 707 assures strong pinning. In fact, the pinned layers 708–712 are pinned so strongly that virtually no external magnetic or electrical force will be able to disrupt the magnetic orientations of the pinned layers 708–712.

The purpose of the AP structure 706 is to provide bias to the sensor 702 to stabilize the free layer. However, because the net moment of the AP structure 706 is zero, it is undesirable for all of the pinned layers 708–712 to be positioned close to the sensor 702 because the net field applied to the sensor 702 will also be zero. Therefore, the middle pinned layer 708 is aligned with the free layer of the sensor 702 whereas the upper and lower layers 710, 712 are fully misaligned from the free layer. The alignment of the middle pinned layer 708 and misalignment of the outer layers 710, 712 provides strong local fields from the middle pinned layer 708 at either end of the sensor 702, while fields from the outer pinned layers 710, 712 are minimized because they are not aligned with the sensor 702. To maximize the field exerted on the sensor 702 by the middle pinned layer 708, the middle pinned layer 708 can be made quite thick, such as about 100 Å. Then the outer pinned layers 710, 712, if of the same material as the middle pinned layer 708, would each be about 50 Å thick.

The fields from all of the pinned layers 708–712 will begin to superimpose towards the middle of the sensor 702. However, the fields are weaker towards the middle of the sensor 702 because of the superposition of the fields from the antiparallel magnetized layers. Thus, the bias structure scheme presented herein provides a high field at the ends of sensor 702 with minimal fields across the remainder of the sensor 702. An additional benefit is that because the fields are weak away from the ends of the sensor 702, the moment of the free layer will have maximum rotation, providing a strong signal during reading.

The thickness of the middle pinned layer 708 should be at least as thick as the free layer (typically about 30 Å) to provide adequate field to stabilize the free layer, and can be many times thicker than the free layer.

Figure 8:
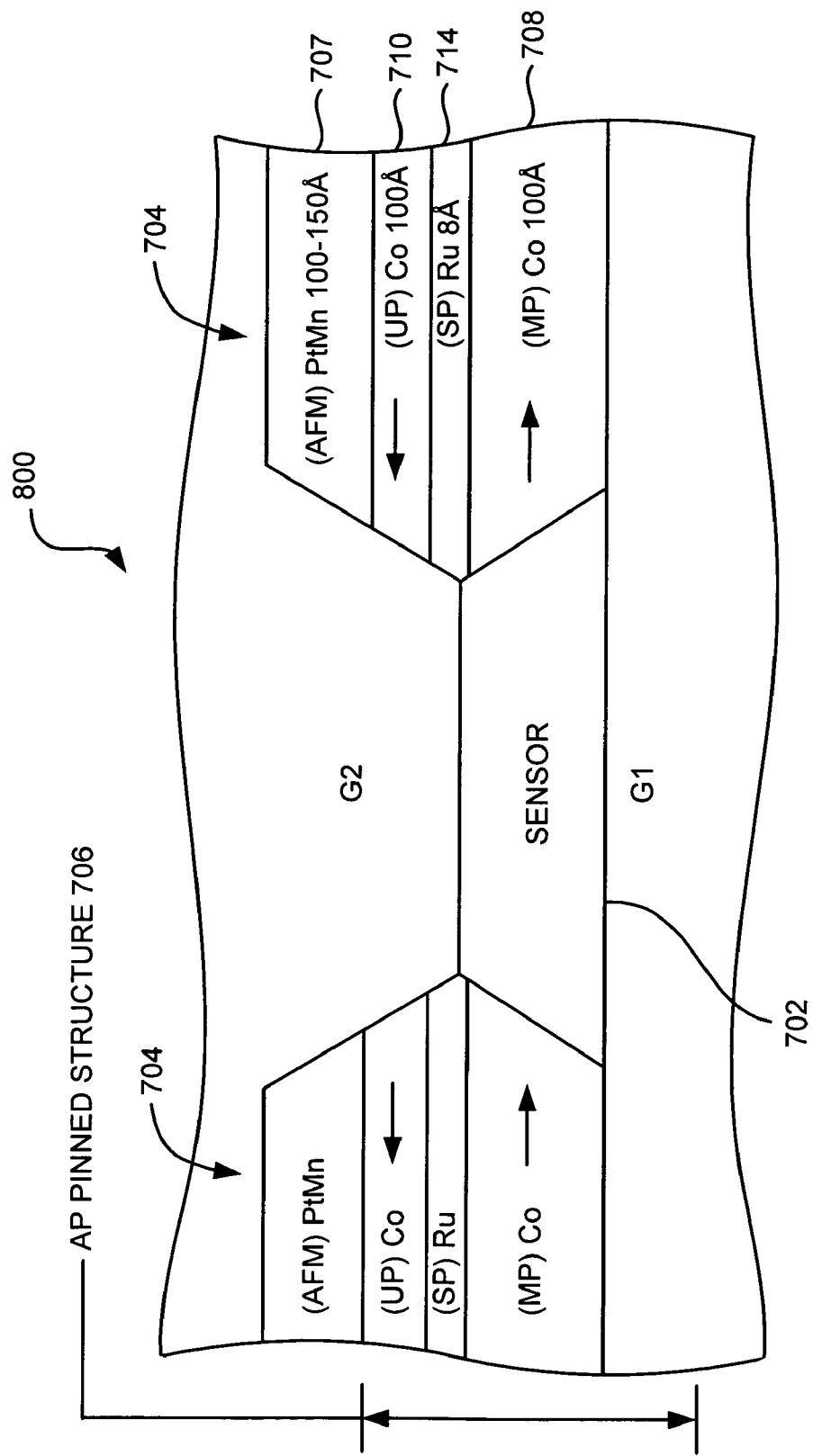
FIG. 8 is an ABS illustration of a sensor structure, not to scale, according to another embodiment of the present invention.

FIG. 8 illustrates a sensor structure 800 according to another embodiment. The structure 800 is similar to the structure 700 of FIG. 7, except that the AP pinned structure 706 includes only two pinned layers 708, 710. This structure 800 may be easier to manufacture, as no pinned layer need be positioned below the sensor 702. In this embodiment, one pinned layer 708 is aligned with the sensor 702. That pinned layer 708 is very thick so that the other pinned layer 710 is positioned away from the sensor 702. Like the embodiment described above, this AP structure provides strong fields at the ends of the sensor 702, and weak fields towards the middle of the sensor 702.

Figure 9:
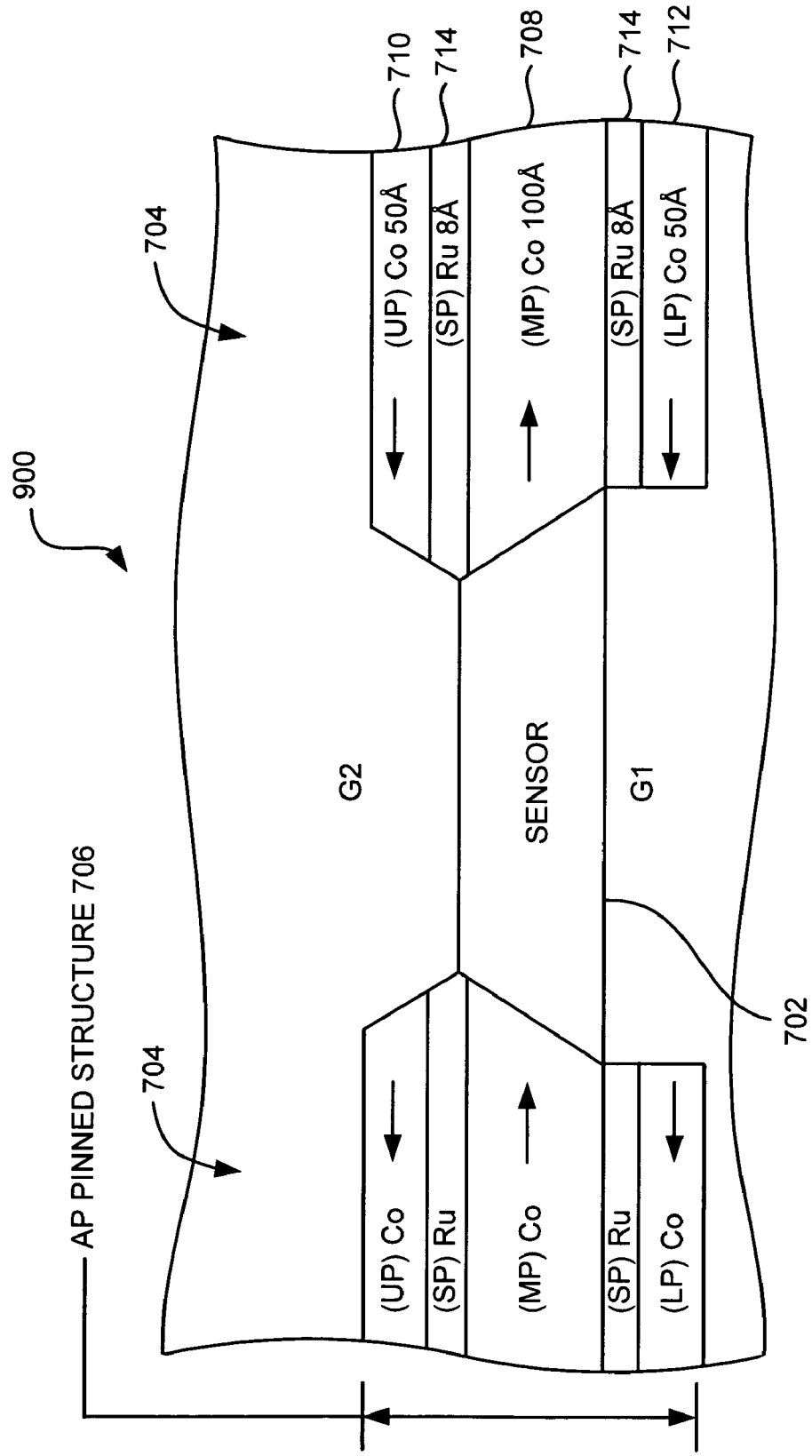
FIG. 9 is an ABS illustration of a sensor structure, not to scale, according to yet another embodiment of the present invention.

FIG. 9 illustrates yet another sensor structure 900. The structure 900 is similar to the structure 700 of FIG. 7, except that no AFM layer is present. Like the embodiments described above, this AP structure provides strong fields at the ends of the sensor 702, and weak fields away from the ends of the sensor 702.

FIG. 10 illustrates an ABS view of a sensor 702 that can be used with the embodiments described herein. Note that other sensor configurations can also be used.

Seed layers are formed on the first layer of insulative material (G1) 1002. The seed layers aid in creating the proper growth structure of the layers above them. Illustrative materials formed in a stack from the first shield layer 1002 are a layer of Ta (SL1-S) 1004, a layer of NiFeCr (SL2-S) 1006, a layer of NiFe (SL3-S) 1008 and a layer of PtMn (SL4-S) 1010. Illustrative thicknesses of these materials are Ta (30 Å), NiFeCr (20 Å), NiFe (8 Å), and PtMn (30 Å). Note that the stack of seed layers can be varied, and layers may be added or omitted based on the desired processing parameters.

Then an antiparallel (SAP) pinned layer structure 1012 is formed above the seed layers. As shown in FIG. 10, first and second AP pinned magnetic layers, (AP1-S) and (AP2-S) 1014, 1016, are separated by a thin layer of an antiparallel coupling (APC-S) material 1018 such that the magnetic moments of the AP pinned layers 1014, 1016 are self-pinned antiparallel to each other. The pinned layers 1014, 1016 have a property known as magnetostriction. The magnetostriction of the pinned layers 1014, 1016 is very positive. The sensor 702 is also under compressive stresses because of its geometry at the ABS, and the configuration of the layer is such that it produces very large compressive stress. The combination of positive magnetostriction and compressive stress causes the pinned layers 1014, 1016 to develop a magnetic anisotropy that is in a perpendicular direction to the track width. This magnetic coupling through the Ru spacer causes the pinned layers 1014, 1016 to have antiparallel-oriented magnetizations.

In the embodiment shown in FIG. 10, the preferred magnetic orientation of the pinned layers 1014, 1016 is for the first pinned layer 1014, into the face of the structure depicted (perpendicular to the ABS of the sensor 702), and out of the face for the second pinned layer 1016. Illustrative materials for the pinned layers 1014, 1016 are $CoFe_{10}$ (100% Co, 10% Fe), $CoFe_{50}$ (50% Co, 50% Fe), etc. separated by a Ru layer 1018. Illustrative thicknesses of the first and second pinned layers 1014, 1016 are between about 10 Å and 25 Å. The Ru layer 1018 can be about 5–15 Å, but is preferably selected to provide a saturation field of above about 10 KOe, ideally about 200 Oe. In a preferred embodiment, each of the pinned layers 1014, 1016 is about 18 Å with an Ru layer 1018 therebetween of about 8 Å.

A first spacer layer (SP1-S) 1020 is formed above the pinned layer structure 1012. Illustrative materials for the first spacer layer 1020 include Cu, $CuO_x$, $Cu/CoFeO_x/Cu$ stack, etc. The first spacer layer 1020 can be about 10–30 Å thick, preferably about 20 Å.

A free layer (FL-S) 1022 is formed above the first spacer layer 1020. The magnetic moment of the free layer 1022 is soft and so is susceptible to reorientation from external magnetic forces, such as those exerted by data on disk media. The relative motion of magnetic orientation of the free layer 1022 when affected by data bits on disk media creates variations in the sensing current flowing through the sensor 702, thereby creating the signal. Exemplary materials for the free layer 1022 are CoFe/NiFe stack, etc. An illustrative thickness of the free layer 1022 is about 10–40 Å.

The magnetic orientation of the free layer 1022 must be preset during manufacture, otherwise the orientation will be unstable and could move around at random, resulting in a "scrambled" or noisy signal. This instability is a fundamental property of soft materials, making them susceptible to any external magnetic perturbations. Thus, the magnetic orientation of the free layer 1022 should be stabilized so that when its magnetic orientation moves, it consistently moves around in a systematical manner rather than a random manner. The magnetic orientation of the free layer 1022 should also be stabilized so that it is less susceptible to reorientation, i.e., reversing. The structure disclosed stabilizes the free layer 1022.

A cap (CAP) 1028 can be formed above the free layer 1022. Exemplary materials for the cap 1028 are Ta, Ta/Ru stack, etc. An illustrative thickness of the cap 1028 is 20–30 Å. A second insulative layer (G2) 1030 is formed above the cap.

While various embodiments have been described above, it should be understood that they have been presented by way of example only, and not limitation. For example, the structures and methodologies presented herein are generic in their application to all MR heads, AMR heads, GMR heads, spin valve heads, etc. Thus, the breadth and scope of a preferred embodiment should not be limited by any of the above-described exemplary embodiments, but should be defined only in accordance with the following claims and their equivalents.

What is claimed is:

1. A magnetic head, comprising:
    a sensor having a free layer, the free layer having a magnetic moment; and
    hard bias structures positioned towards opposite ends of the sensor, the hard bias structures stabilizing the magnetic moment of the free layer, each hard bias structure comprising;
        an antiparallel (AP) pinned layer structure, the AP pinned layer structure having a middle pinned layer aligned along a plane of the free layer of the sensor, and outer pinned layers positioned on opposite sides of the middle pinned layer; and
        an antiferromagnetic layer positioned towards each of the AP pinned layer structures, each antiferromagnetic layer stabilizing a magnetic moment of the pinned layer closest thereto.

2. A head as recited in claim 1, wherein a net magnetic moment of the AP pinned layer structure is about zero.

3. A head as recited in claim 1, wherein a thickness of the middle pinned layer is at least as thick as the free layer of the sensor.

4. A head as recited in claim 1, wherein a thickness of the middle pinned layer is at least twice as thick as the free layer of the sensor.

5. A head as recited in claim 1, wherein the outer pinned layers are misaligned from the free layer.

6. A head as recited in claim 1, wherein the pinned layers of the AP pinned layer structure each include at least Co, wherein the pinned layers are separated by a layer of Ru.

7. A head as recited in claim 1, wherein the antiferromagnetic layers each include at least one of PtMn and IrMn.

8. A magnetic storage system, comprising:
    magnetic media;
    at least one head for reading from and writing to the magnetic media, each head having:
        a reading portion having the structure recited in claim 1;
        a write element coupled to the sensor;

a slider for supporting the head; and a control unit coupled to the head for controlling operation of the head.

9. A head as recited in claim 1, wherein a net magnetic moment of the AP pinned layer structure is about zero.

10. A head as recited in claim 1, wherein a thickness of the first pinned layer is at least as thick as the free layer of the sensor.

11. A head as recited in claim 1, wherein a thickness of the first pinned layer is at least twice as thick as the free layer of the sensor.

12. A head as recited in claim 1, wherein the at least second pinned layer is misaligned from the free layer.

13. A magnetic head, comprising:

a sensor having a free layer, the free layer having a magnetic moment; and hard bias structures positioned towards opposite ends of the sensor, the hard bias structures stabilizing the magnetic moment of the free layer, each hard bias structure comprising;
an antiparallel (AP) pinned layer structure, the AP pinned layer structure having a first pinned layer aligned along a plane of the free layer of the sensor, and at least a second pinned layer for pinning a magnetic orientation of the first pinned layer; and
an antiferromagnetic layer positioned towards each of the AP pinned layer structures, each antiferromagnetic layer stabilizing a magnetic moment of the pinned layer closest thereto.

14. A magnetic head, comprising:

a sensor having a free layer, the free layer having a magnetic moment; and hard bias structures positioned towards opposite ends of the sensor, the hard bias structures stabilizing the magnetic moment of the free layer, each hard bias structure comprising;
an antiparallel (AP) pinned layer structure, the AP pinned layer structure having a first pinned layer aligned along a plane of the free layer of the sensor, and at least a second pinned layer for pinning a magnetic orientation of the first pinned layer;

wherein each AP pinned layer structure includes a middle pinned layer aligned along a plane of the free layer of the sensor, and outer pinned layers positioned on opposite sides of the middle pinned layer.

15. A magnetic head, comprising:

a sensor having a free layer, the free layer having a magnetic moment; and hard bias structures positioned towards opposite ends of the sensor, the hard bias structures stabilizing the magnetic moment of the free layer, each hard bias structure comprising;
an antiparallel (AP) pinned layer structure, the AP pinned layer structure having a first pinned layer aligned along a plane of the free layer of the sensor, and at least a second pinned layer for pinning a magnetic orientation of the first pinned layer;

wherein a thickness of the first pinned layer is at least twice as thick as the free layer of the sensor.

16. A magnetic head, comprising:

a sensor having a free layer, the free layer having a magnetic moment; and hard bias structures positioned towards opposite ends of the sensor, the hard bias structures stabilizing the magnetic moment of the free layer, each hard bias structure comprising;
an antiparallel (AP) pinned layer structure, the AP pinned layer structure having a first pinned layer aligned along a plane of the free layer of the sensor, and at least a second pinned layer for pinning a magnetic orientation of the first pinned layer, wherein a thickness of the first pinned layer is at least as thick as the free layer of the sensor.

17. A head as recited in claim 16, wherein a net magnetic moment of the AP pinned layer structure is about zero.

18. A head as recited in claim 16, wherein the at least second pinned layer is misaligned from the free layer.

19. A magnetic storage system, comprising:

magnetic media;

at least one head for reading from and writing to the magnetic media, each head having:
a reading portion having the structure recited in claim 16;
a write element coupled to the sensor;

a slider for supporting the head; and a control unit coupled to the head for controlling operation of the head.

* * * * *